July 24, 1962 S. J. SERPICO 3,046,018
MAGNETIC LETTER SPINNING GAME
Filed Nov. 20, 1959 2 Sheets-Sheet 1

INVENTOR.
SEBASTIAN J. SERPICO
BY
ATTORNEY

July 24, 1962 S. J. SERPICO 3,046,018
MAGNETIC LETTER SPINNING GAME
Filed Nov. 20, 1959 2 Sheets-Sheet 2

INVENTOR.
SEBASTIAN J. SERPICO
BY
*Jotton G Holoshet*
ATTORNEY

United States Patent Office 3,046,018
Patented July 24, 1962

3,046,018
MAGNETIC LETTER SPINNING GAME
Sebastian J. Serpico, 3A Maspeth Ave., Brooklyn, N.Y.
Filed Nov. 20, 1959, Ser. No. 854,360
2 Claims. (Cl. 273—142)

This invention relates to the art of game devices and particularly concerns a word or letter selection apparatus operable by spinning a letter carrying dial.

A principal object of the invention is to provide a game in which a dial carries a plurality of letters, the dial being provided with a magnetic element disposed to be attracted and held by a magnet whereby a selected letter is displayed when said element is held by the magnet.

Another object is to provide a device having a dial rotatable by a player, the dial rotating until stopped by magnetic attraction of the dial at a position for displaying a randomly selected letter carried by the dial.

A further object is to provide a device with a rotatable disk carrying a plurality of rotatable dials, the disk and dials being rotatable until stopped by magnetic attraction of the dials at positions for displaying randomly selected letters carried by the dials.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
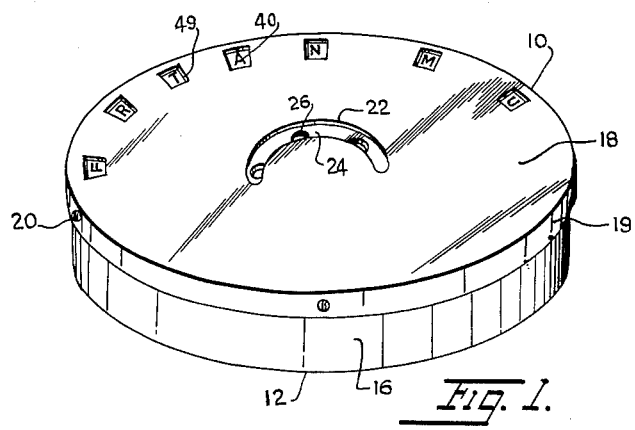
FIG. 1 is a perspective view of a game device embodying the invention.
Figure 2:
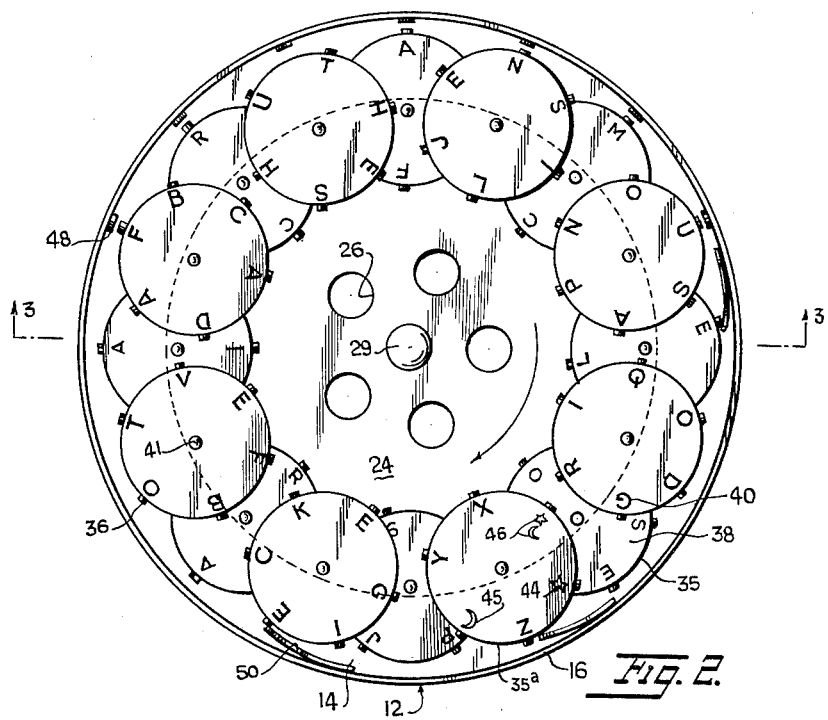
FIG. 2 is a top plan view on an enlarged scale of the device, with the cover thereof removed.
Figure 3:
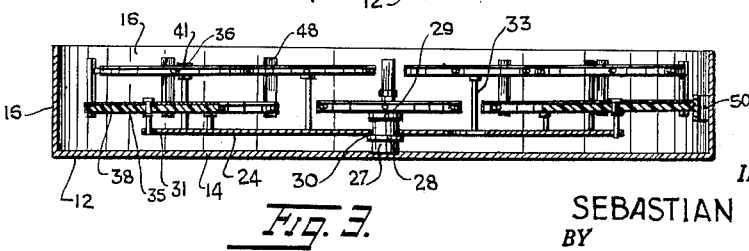
FIG. 3 is a sectional view taken on line 3—3 of FIG. 2.
Figure 4:
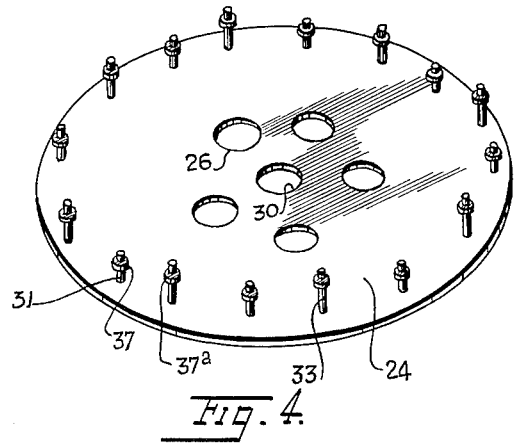
FIG. 4 is a perspective view of a disk employed in the device.
Figure 5:
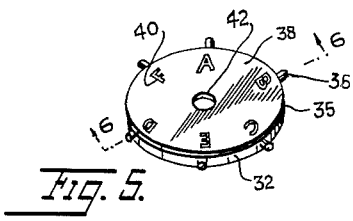
FIG. 5 is a perspective view of a lettered dial employed in the device.

Referring to FIGS. 1–7, there is shown a game device 10 including a cylindrical base 12 having a flat bottom 14, an upstanding wall 16 and an open top. A cover or face plate 18 having a depending skirt 19 may be removably seated on the open top of the base and secured thereto by screws 20 as best shown in FIG. 1. The circular plate 18 has an arcuate slot 22 extending about the center of the plate through about 180° of arc. The slot is wide enough for a player to insert his index finger therethrough for turning a rotatable disk 24. Disk 24 is a circular member as best shown in FIGS. 2, 3 and 4. It has a plurality of circumferentially spaced holes 26 disposed under slot 22 so that the player can engage a finger in one of the holes 26 and turn the disk.

Disk 24 is rotatably mounted on a stationary post 27 having a flange 28 supporting the disk and a cap 29 holding the disk on the post. The post passes through a central aperture 30 in the disk. The post is secured by welding or otherwise to the flat bottom 14 of the base.

Circumferentially and uniformly spaced around the disk are pins 31, 33 arranged alternately. Pins 31 are shorter than 33. Flanges 37, 37a on the pins 31 and 33, respectively, are located below their upper free ends.

Figure 7:
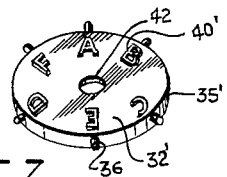
FIG. 7 is a perspective view of another dial.
Figure 6:
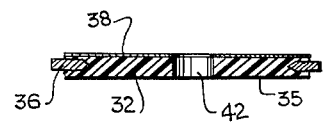
FIG. 6 is a sectional view on an enlarged scale taken on line 6—6 of FIG. 5.

On the pins 31 and 33 are freely rotatable dials 35 best shown in FIGS. 2, 3, 5 and 6. Each dial is a circular member formed of a nonmagnetic material such as plastic, wood, or nonmagnetic metal, i.e. copper, brass, aluminum, etc. Each dial 35 includes a disk 32 which carries a plurality of permanent magnetic pins 36 equally spaced around the periphery of the dial. The pins are preferably made of steel or other magnetizable metal. On the upper surface of the disk 32 is a paper sheet 38 marked with letters 40 located adjacent to the respective pins. Instead of a paper sheet, the letters 40 may be printed, engraved, or otherwise carried directly on the upper surface of the disk. As shown in FIG. 7, dial 35′ has letters 40′ molded directly on the body of the plastic disk 32′.

The dials 35, 35′ have central apertures 42 for receiving the upper ends of pins 31, 33. The dials are rotatable freely on the pins and are mounted in alternate interleaved or overlapped array as clearly shown in FIGS. 2 and 3. The radius of each dial is slightly less than the distance between successive pins 31, 33. A cap 41 is placed on the top of each pin to prevent the dial from coming off the pin. In the preferred form of the game device shown, sixteen dials are employed. Each dial has six letters or symbols thereon, preferably with four consonants and two vowels. One dial 35a has the three consonants X, Y and Z, also a star 44, a crescent 45, and a star-crescent symbol 46.

Secured to the inner side of wall 16 are a plurality of equally spaced permanent magnets 48. Just above these magnets and radially inward thereof on the cover face plate 18 are holes 49 spaced circumferentially as shown in FIG. 1. Seven magnets are shown in FIGS. 2 and 3 but more or less magnets may be used along with more or less corresponding holes 49 in plate 18. The magnets are spaced about 22.5° of arc apart if sixteen dials 35 are used. When the disk 24 is stationary, then the magnets will hold a corresponding number of adjacent dials 35 stationary by force of attraction between each magnet and the adjacent one of the magnetic pins 36 carried by the particular dial. When the dials are so held, an array of letters 40 will appear at holes 49 and will be visible at the top of the device. A plurality of flexible leather strips 50 are secured to the inner side of wall 16 spaced away from the magnets. These strips normally touch the peripheries of the dials and permit them to move past when the disk 24 is turned, but because of the frictional contact of the strips on the peripheries of the dials and on the protruding pins 36, the strips cause random free rotation of the dials on the pins 31, 33.

When the game is assembled as indicated in FIG. 1, the disk 24 can be rotated to cause the successive dials 35 to move past the magnets 48. As each dial passes the magnets some random rotation may be imparted thereto. Further random rotation is imparted by the strips 50. The player can cause the disk 24 to rotate several times by a quick, flicking movement of his finger along the full length of slot 22 while the finger is engaged in one of the holes 26 in disk 24. Disk 24 will rotate on post 27 and when the momentum is spent the magnets 48 will attract the adjacent pins 36 and the dials will be caused to stop at a position where seven pins 36 of seven consecutive dials will be disposed adjacent to the seven magnets 48 as shown in FIG. 2. There will then appear at holes 49 a display of letters selected entirely by chance.

Figure 8:
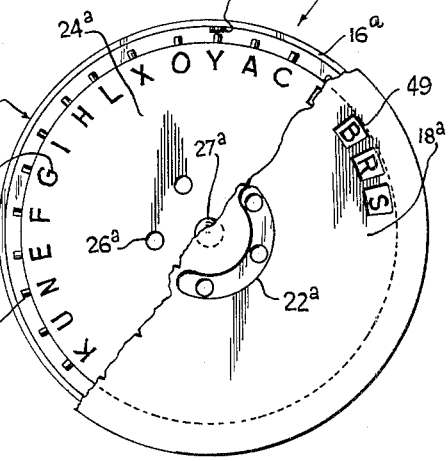
FIG. 8 is a top plan view on a reduced scale of another game device according to the invention, the portion of a cover of the device being broken away to show internal parts.

In FIG. 8 is shown a modified form of the invention. Game 10ª has a circular dial 24ª which carries letters 40ª marked directly thereon near its periphery. The dial rotates freely on post 27ª. Magnetic pins 36ª extend radially from the dial. A single magnet 48ª is located on wall 16ª of the base 12ª. Dials 35 are omitted. The player makes a random selection of a particular sequence of letters 40ª on the dial by spinning the dial on post 27ª. Slot 22ª in the cover face plate 18ª and holes 26ª in the dial permit the dial to be rotated as described above for disk 24. The dial 24ª stops rotation when magnet 48ª attracts a particular pin 36ª as shown in FIG. 8.

After the selection of letters is made and appears at holes 49 in face plates 18 or 18ª, they may be employed in further play in any of several ways presented below as examples.

For children as an educational game:

Paper pads are given to each child player. As the letters appear in the game device 10 or 10ª, the player tries to rearrange the letters to form the names of animals, countries of the world, rivers, cities, states, etc. The player receives a number of chances or turns at spinning the dials. The player who forms the most words in the particular category selected wins the game. If the player can form only part of a word with all seven letters appearing on the game device, he is credited with having formed the entire longer word.

Figure 9:
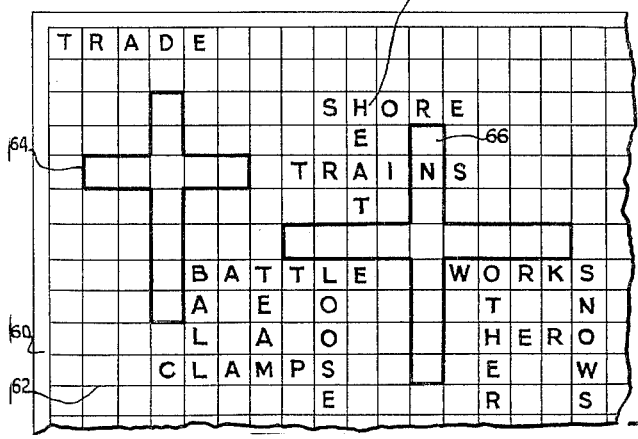
FIG. 9 is a fragmentary plan view of a game sheet which may be employed in playing with the devices of FIGS. 1 or 8.

For adults or children as a pastime and as an educational device:

Sheets 60 as shown in FIG. 9 may be distributed to each player. Each sheet has a gridwork 62 of squares printed thereupon with a plurality of squares outlined by colored lines to form crosses 64, 66 or other patterns. As the letters appear on the game device each player tries to form words on sheet 60 from the several letters. He enters the words anywhere on the sheet either lengthwise or sidewise. The first word may not start or pass through one of the patterns 64, 66. The play continues with the player building a crossword pattern as indicated at 68 in which "Heat" intersects the first word "Shore" and "Trains" intersects "Heat."

If desired, a single playing sheet 60 may be used and each player builds words on the word or words entered previously by another player or players. The player whose word crosses one of the patterns 64, 66 may be credited with five points, in addition to one credit for each letter of the word. Thus, the player who entered the word "Trains" earns ten points. If a player attaches a word to two other previously entered words, the player may be given a double word score. Thus, the player who entered the word "Hero" which is built on the two other words "Other" and "Snows" is credited with twice the five points allowed for the four letter word "Hero" or eight points. A player who attaches a word to three other previously entered words may be given a triple word score. Thus, the word "Clamps" earns eighteen points since it crosses "Ball," "Team" and "Loose," and the six points earned for the six letter word "Clamps" are multiplied by three. The several patterns 64, 66 may be differently colored and different numbers of additional points may be allowed for words crossing the different patterns. When symbols such as the star 44, crescent 45, star-crescent 46 or other symbols appear on the face of the game device, the player may be permitted to use one as an additional optionally selected vowel, another as an optionally selected consonant, and another as any letter, vowel or consonant as desired. If desired, a transparent paper sheet can be placed over the sheet 60 on which patterns 64, 66 appear and the player can then write his words on the paper sheet.

Figure 10:
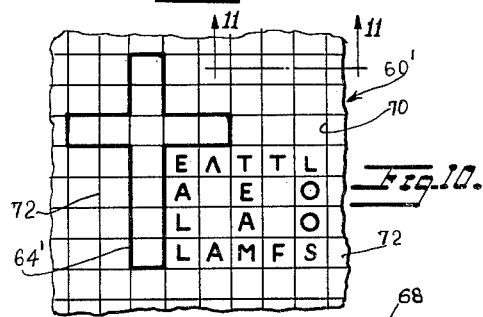
FIG. 10 is a fragmentary view similar to FIG. 9 of a modified form of game sheet.
Figure 11:
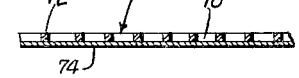
FIG. 11 is a sectional view on the line 11—11 of FIG. 10.

In FIGS. 10 and 11, a modified form of playing sheet 60' is shown. This comprises a plastic sheet molded with square holes 70, to form a grid, the dividing walls 72 of certain adjacent square holes being colored to form a pattern, such as the cross 64'. In using this grid 60', another solid paper sheet 72 is placed underneath and the letters building up the words are written on the sheet 72 through the holes.

The game device can be used to play a challenge game. In this game the player spins the disk and from the seven letters appearing on the face of the device formulates as many words as he can. If any other player questions the acceptability of any word, the first player may challenge the other player. By challenging he assumes the risk of automatically losing the game if the word challenged does not appear in an agreed upon dictionary. The other player is then credited with the loser's words. Each player may spin the game dial a predetermined number of times. The player who first earns a predetermined number of words wins, or the player with the most words wins. In general, if a player can form the letters appearing on the dials into the first seven letters of a longer word he may be credited with the entire number of letters in the longer word.

Other equally diverting and entertaining ways will readily occur to players of the game.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A game device comprising a cylindrical base, a circular disk rotatably mounted on said base, a plurality of circular dials carried by said disk and rotatable on pins, said pins being circumferentially spaced equally around the periphery of said disk, each of said dials carrying a plurality of circumferentially spaced letters, a plurality of magnetic elements carried by each dial and located respectively near corresponding letters on the dial, further magnetic elements carried circumferentially by said base and spaced radially slightly from said dials, a face plate on said base covering said disk and dials, means for rotating said disk and said dials, and means for displaying one letter of each of a number of said dials when said disk and said dails are stationary, the means for rotating said dials including flexible members carried by said base and frictionally engaging the dials during rotation of the disk, the means for rotating said disk including a plurality of holes in the disk and an arcuate slot in said face plate disposed over said holes, said aligned holes and slot adapted to receive a finger of the player for turning the disk, said base, face plate, disk, and each of said dials being formed of nonmagnetic material, each of the first-named magnetic elements on said dials being magnetic pins extending radially from the dials, each of said further magnetic elements being a magnet attracting the adjacent pins and dials.

2. A game device comprising a cylindrical base, a circular disk rotatably mounted on said base, a plurality of circular dials carried by said disk and rotatable on pins, said pins being circumferentially spaced equally around the periphery of said disk, each of said dials carrying a plurality of circumferentially spaced letters, a plurality of magnetic elements carried by each dial and located respectively near corresponding letters on the dial, further magnetic elements carried circumferentially by said base and spaced radially slightly from said dials, a face plate on said base covering said disk and dials, means for rotating said disk and said dials, and means for displaying one letter of each of a number of said dials when said disk and said dials are stationary, the means for rotating said dials including flexible members carried by said base and frictionally engaging the dials during rotation of the disk, the means for rotating said disk including a plurality of holes in the disk and an arcuate slot in said face plate disposed over said holes, said aligned holes and slot adapted to receive a finger of the player for turning the disk, said base, face plate, disk, and each of said dials being formed of nonmagnetic material, each of the first-named magnetic elements on said dials being magnetic pins extending radially from the dials, each of said further magnetic elements being a magnet attracting the adjacent pins and dials, said means for displaying the letters being holes formed in the face plate and circumferentially spaced thereon.

References Cited in the file of this patent

UNITED STATES PATENTS

| | | |
|---|---|---|
| 636,508 | Eickershoff | Nov. 7, 1899 |
| 2,183,506 | Robinson | Dec. 12, 1939 |
| 2,208,351 | Von Berg | July 16, 1940 |
| 2,246,383 | Rice | June 17, 1941 |
| 2,610,855 | Spiller | Sept. 16, 1952 |
| 2,712,446 | McKeever | July 5, 1955 |

FOREIGN PATENTS

| | | |
|---|---|---|
| 487,047 | Italy | Nov. 20, 1953 |